US 6,536,740 B2

(12) United States Patent
Hademenos et al.

(10) Patent No.: US 6,536,740 B2
(45) Date of Patent: Mar. 25, 2003

(54) DISCONNECTED PISTON FOR A VALVE ACTUATOR

(75) Inventors: Jim P. Hademenos, Houston, TX (US); Randall D. Harkins, Spring, TX (US); Thomas P. Kelly, Houston, TX (US)

(73) Assignee: Cooper Cameron Corporation, Houston, TX (US)

( * ) Notice: Subject to any disclaimer, the term of this patent is extended or adjusted under 35 U.S.C. 154(b) by 15 days.

(21) Appl. No.: 09/821,218

(22) Filed: Mar. 29, 2001

(65) Prior Publication Data
US 2002/0139948 A1 Oct. 3, 2002

(51) Int. Cl.[7] ............................................. F16K 3/00
(52) U.S. Cl. ...................... 251/63.4; 251/63.6; 251/329
(58) Field of Search ............................ 251/63.4, 63.6, 251/329, 77

(56) References Cited

U.S. PATENT DOCUMENTS

| | | | | |
|---|---|---|---|---|
| 3,316,929 A | * | 5/1967 | Millette | 251/329 |
| 3,410,304 A | * | 11/1968 | Paul, Jr. | 251/63.4 |
| 3,955,623 A | * | 5/1976 | Aumann | 251/63.4 |
| 3,993,284 A | | 11/1976 | Lukens, Jr. | 251/63.6 |
| 4,091,832 A | * | 5/1978 | Snyder et al. | 251/63.4 |
| 4,135,546 A | | 1/1979 | Morrison | 137/315 |
| 4,135,547 A | | 1/1979 | Akkerman et al. | 137/315 |
| 4,287,812 A | * | 9/1981 | Iizumi | 251/63.4 |
| 4,359,203 A | * | 11/1982 | Cho | 251/63.4 |
| 4,436,279 A | | 3/1984 | Bonds et al. | 251/86 |
| 4,682,757 A | * | 7/1987 | Shelton | 251/77 |
| 4,840,347 A | * | 6/1989 | Ariizumi et al. | 251/63.4 |
| 4,934,652 A | | 6/1990 | Golden | 251/63.6 |
| 5,390,895 A | * | 2/1995 | Iwabuchi | 251/63.4 |
| 5,494,078 A | * | 2/1996 | Schulte | 251/63.4 |
| 6,125,874 A | | 10/2000 | Holliday | 137/81.2 |
| 6,138,712 A | * | 10/2000 | Hirose | 251/63.4 |

OTHER PUBLICATIONS

Web pages, "Hydraulic Linear Actuator", Nov. 22, 2000, http://www.rotator.no/products, , 2 Pages.

* cited by examiner

Primary Examiner—Henry C. Yuen
(74) Attorney, Agent, or Firm—Michael P. Hartmann; Peter A. Bielinski

(57) ABSTRACT

A valve and valve actuator utilizing a disconnected piston design that separates under conditions of excessive actuator internal pressure to prevent overloading and damaging the threaded connection between the valve stem and actuator piston is disclosed. The hydraulically actuated valve actuator comprises a spring housing including a bonnet for coupling the spring housing to a valve. The spring housing includes an upper head and a packing gland that are sealingly attached to the spring housing to form an interior pressure chamber. The interior pressure chamber has a pressure responsive actuator piston disposed therein with a coil spring designed to move the actuator piston from a normally open to a fail closed position. The pressure responsive actuator piston includes a piston and a spring retainer nut that are separable after closing of the valve to prevent ambient pressure acting within the pressure chamber on the pressure responsive actuator piston from overloading the valve stem.

14 Claims, 5 Drawing Sheets

DISCONNECTED PISTON FOR A VALVE ACTUATOR

BACKGROUND OF THE INVENTION

1. Field of the Invention

This invention relates to a disconnected piston for use in valve actuators that are used to operate valves, especially gate valves, that are operated between a first position in which fluid flows through the valve bore and a second position in which the valve bore is closed. Such valves have a variety of applications in the oil and gas industry such as controlling the flow of hydrocarbon fluids through well heads, controlling fluid flow in pipelines and a most critical operation, controlling the flow of pressurized control fluid to and from pressure actuated assemblies such as blowout preventers or other valve actuators.

When these valve actuators are used in a subsea environment, their proper operation is particularly critical as the valves being actuated are positioned on assemblies called subsea trees at great water depths where human intervention is extremely difficult. As the search for oil and gas in offshore locations has grown, it has been directed into deeper and deeper water depths. Today oil and gas exploration and production operations in water depths of 6,000 to 10,000 feet is becoming routine, with deeper water systems planned.

At these extreme water depths, the ambient pressure of the sea water becomes a factor in the design and operation of the aforementioned valve actuators. At these depths the ambient pressure of the water can interfere with the operation of the typical subsea valve actuator. These valve and actuator assemblies are typically lowered from the surface with their interior pressure chambers, acting through the control system, experiencing the full hydrostatic head of the water, which is approximately 3,000 psi at a 6,000 foot water depth. These high pressures can cause the valve actuator to malfunction or fail when the equipment is lowered to its operating depth as a result of excessive reverse pressure acting on the piston of the actuator.

2. Description of Related Art

U.S. Pat. No. 4,135,547 to N. H. Akkerman et al. shows a gate valve actuator with a secondary annular chamber that acts as an accumulator and a secondary back-up system for operating the valve.

A dual stage valve actuator for operating a gate is disclosed in U. S. Pat. No. 4,934,652 to T. A. Golden. This apparatus uses a two-part piston to provide a high initial force for overcoming frictional forces.

U.S. Pat. No. 6,125,874 to D. G. Holliday shows a gate valve actuator using valve body pressure with a floating ring to provide additional force for moving the valve to its fail-safe position.

A gate valve actuator design using a dual piston design to control the closing force of the valve actuator is shown on the Internet at www.rotator.no/products/actuator.html.

SUMMARY OF THE INVENTION

The present invention comprises a gate valve actuator utilizing a disconnected piston design that separates under conditions of excessive actuator internal pressure to prevent overloading and damaging the threaded connection between the valve stem and actuator piston. The hydraulically actuated valve actuator comprises a spring housing including a bonnet for coupling the spring housing to a valve. The bonnet includes a valve stem bore extending there through and a seal assembly disposed around the periphery of the valve stem bore for sealing a valve stem extending through the bonnet. The spring housing includes an upper head and a packing gland that are sealingly attached to the spring housing to form an interior pressure chamber.

The interior pressure chamber has a pressure responsive actuator piston disposed therein with a large coil spring between the spring retainer nut and the packing gland. The spring retainer nut is connected to an adapter stem which is then threaded onto a valve stem extending through the bonnet to a valve gate. The coil spring is designed to move the valve gate from a normally open position to a fail closed position. The pressure responsive actuator piston includes a piston and a spring retainer nut that are separable after closing of the valve to prevent ambient pressure acting within the pressure chamber on the pressure responsive actuator piston from overloading the valve stem to piston coupling. The packing gland includes a valve stem bore therethrough and a seal ring disposed around the valve stem bore for sealing the valve stem extending through the packing gland. The actuator is attached to a gate valve body by a plurality of tie bolts. The gate valve is of a conventional construction with a fluid flow bore therethrough and a gate member movable between first and second positions for opening and closing the fluid flow bore. The valve stem is coupled to the gate member by suitable means as a T connection or buttonhead connection.

A principal object of the present invention is to provide a valve actuator for use in environments where the load generated by the pressure acting in reverse on the pressure responsive piston of the valve actuator is not transmitted to the valve stem and thereby ensuring the valve stem is not overloaded.

Another object of the present invention is to provide a valve actuator that is suitable for use with a subsea control system that ensures the hydrostatic pressure load generated by control system does not overload or damage the valve actuator to stem connection.

These with other objects and advantages of the present invention are pointed out with specificness in the claims annexed hereto and form a part of this disclosure. A full and complete understanding of the invention may be had by reference to the accompanying drawings and description of the preferred embodiments.

BRIEF DESCRIPTION OF THE DRAWINGS

These and other objects and advantages of the present invention are set forth below and further made clear by reference to the drawings, wherein.

DESCRIPTION OF THE PREFERRED EMBODIMENTS

Figure 1:
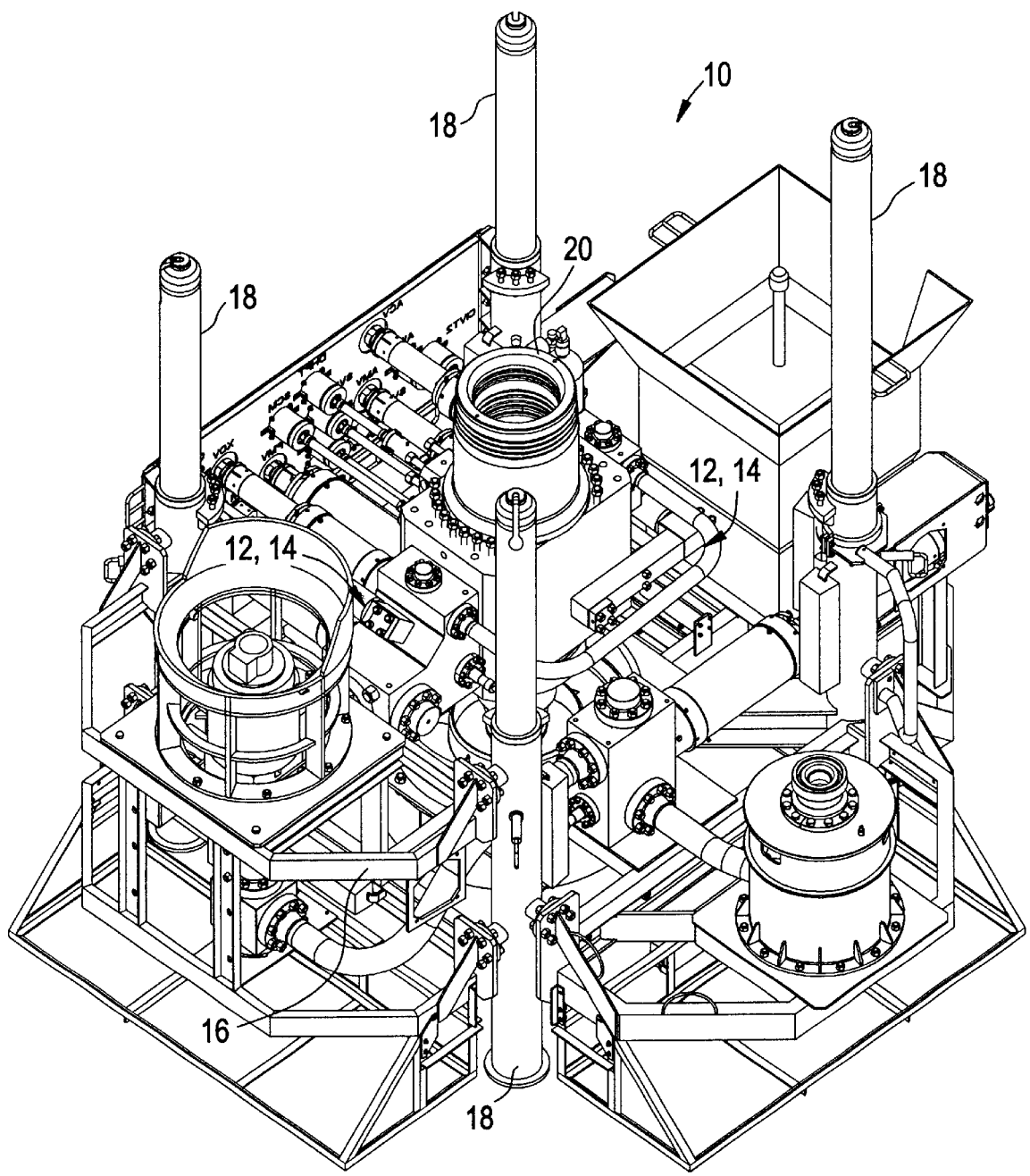
FIG. 1 is a perspective view of an illustrative subsea tree with valves using the valve actuator of the present invention mounted thereon.

With reference to the drawings, and particularly to FIG. 1, a perspective view of a typical subsea tree 10 with a pair of gate valves 12 upon each of which a valve actuator 14 of the present invention is mounted is shown. Subsea tree 10 is of a conventional configuration well known to those of ordinary skill in the art and includes structural frame 16 with guide posts 18 at each corner. Tree hub 20 is positioned at the center of subsea tree 10 and configured for connection to a suitable hydraulic connector (not shown) for lowering to the sea floor. Such subsea trees are designed to operate in offshore water depths up to 8,000 feet which produces an ambient hydrostatic pressure of approximately 4,000 psi., with plans for yet greater water depths.

Figure 2:
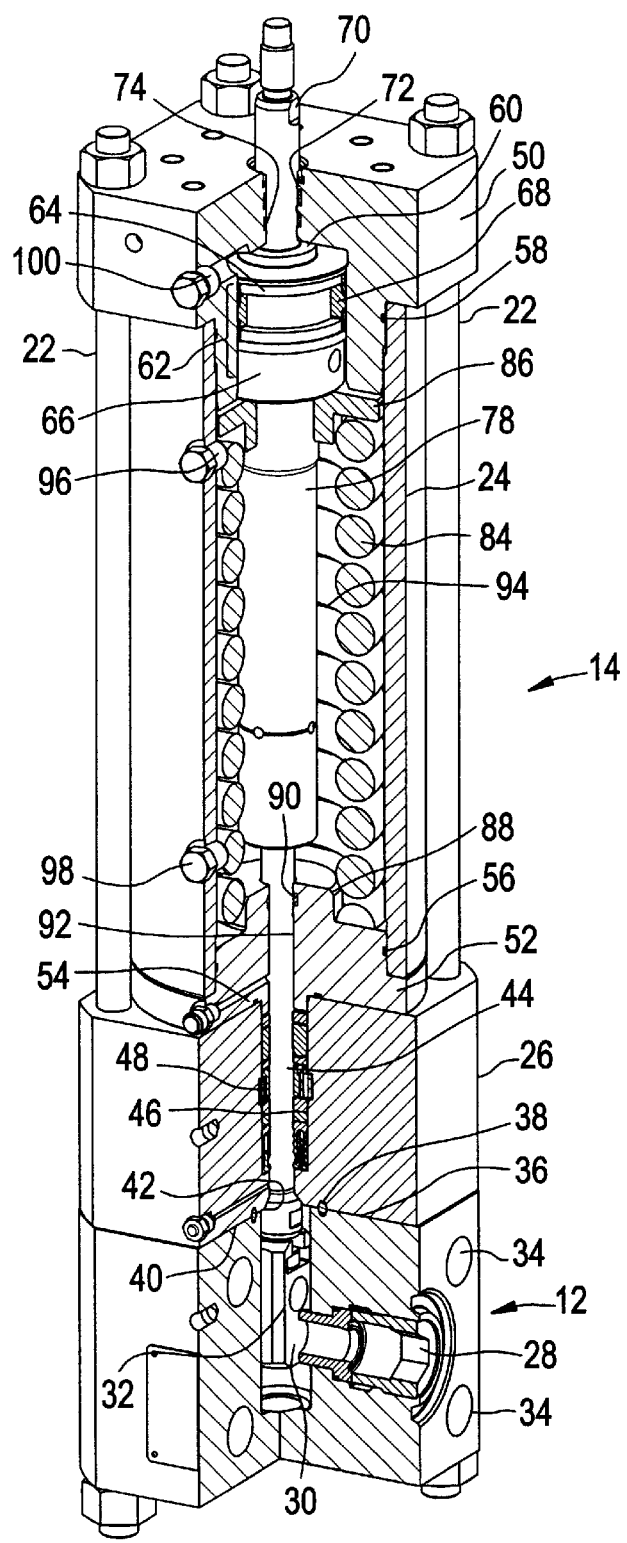
FIG. 2 is a perspective view with a quarter section removed of a valve and actuator assembly showing the internal components of the present invention.

Valve 12 and valve actuator 14 are shown assembled in FIG. 2 in a perspective view with a quarter section removed showing the internal components. Valve actuator 14 is connected to valve 12 by suitable coupling means as tie bolts 22. Although shown with tie bolts 22, it will be understood by those of ordinary skill in the art that other suitable coupling means as clamp hubs or flanges could be used without departing from the scope of the present invention. Valve actuator 14 includes spring housing 24 which is connected to valve 12 through bonnet 26.

Valve 12 is a gate valve of a conventional configuration with fluid flow bore 28 extending therethrough. Gate member 30 with gate bore 32 is interposed midway through fluid flow bore 28 and is movable by valve actuator 14 between first and second positions in fluid flow bore 28 for opening and closing fluid flow bore 28. Valve 12 has stud holes 34 on its outer faces to accept bolt studs for connection to adjacent fluid flow lines.

Upper face 36 of valve 12 is machined to accept metal gasket 38 and mate with matching machined lower face 40 of bonnet 26 to form a fluid seal between valve 12 and bonnet 26. Bonnet 26 includes stem backseat shoulder 42 on lower face 40 for purposes to be explained hereinafter. Valve stem 44 extends through valve stem bore 46 of bonnet 26. Suitable sealing means as seal assembly 48 is disposed in valve stem bore 46 to ensure a pressure tight seal. Valve stem 44 is connected to gate member 30 by suitable means as a "T" connection or buttonhead connection, well known to those of ordinary skill in the art.

Spring housing 24 is a generally cylindrical member with upper head 50 and packing gland 52 disposed at its upper and lower ends, respectively. Packing gland 52 is sealed to bonnet 26 and spring housing 24 by suitable sealing means as seal ring 54 and 56, respectively. Similarly, upper head 50 is sealed to spring housing 24 by seal ring 58. Upper head 50 has a counterbore therein to form upper pressure chamber 60 therein. Disposed within upper pressure chamber 60 is pressure responsive actuator piston 62. Pressure responsive actuator piston 62 is of a disconnected or two part configuration and includes piston 64 and spring retainer nut 66, seen in cross sectional detail in FIGS. 3–5. Seal assembly 68 is disposed on the exterior of piston 64 and seals within upper pressure chamber 60. Rising indicator stem 70 is integrally formed on the upper end of piston 64 and is sealed in bore 72 by seal rings 74.

Spring retainer nut 66 is threaded internally and receives threaded end 76 of adapter stem 78 therein. Set screws 80 lock spring retainer nut 66 to threaded end 76. Adapter stem 78 is threaded on its lower end and receives threaded end 82 of valve stem 44 therein. Positioned radially outwardly from adapter stem 78 is urging means in the form of coil spring 84 for moving pressure responsive actuator piston 62 and gate member 30 from its open to its closed position in a manner to be described hereinafter. Coil spring 84 is restrained in a centralized position at its upper end by spring retainer 86 which shoulders against spring retainer nut 66. The lower end of coil spring 84 is similarly restrained in a centralized position at its lower end by raised inner face 88 formed on packing gland 52. Seal ring 90 is positioned in valve stem bore 92 of packing gland 52 and seals against valve stem 44.

An interior pressure chamber 94 is defined within spring housing 24 by the annular chamber sealed by seal rings 56, 58 and 90 and seal assembly 68. Interior pressure chamber 94 is accessed through fluid ports 96 and 98. Similarly, upper pressure chamber 60 is defined within upper head 50 by the chamber sealed by seal assembly 68 and seal rings 74. Upper pressure chamber 60 is accessed through fluid port 100.

Figure 3:
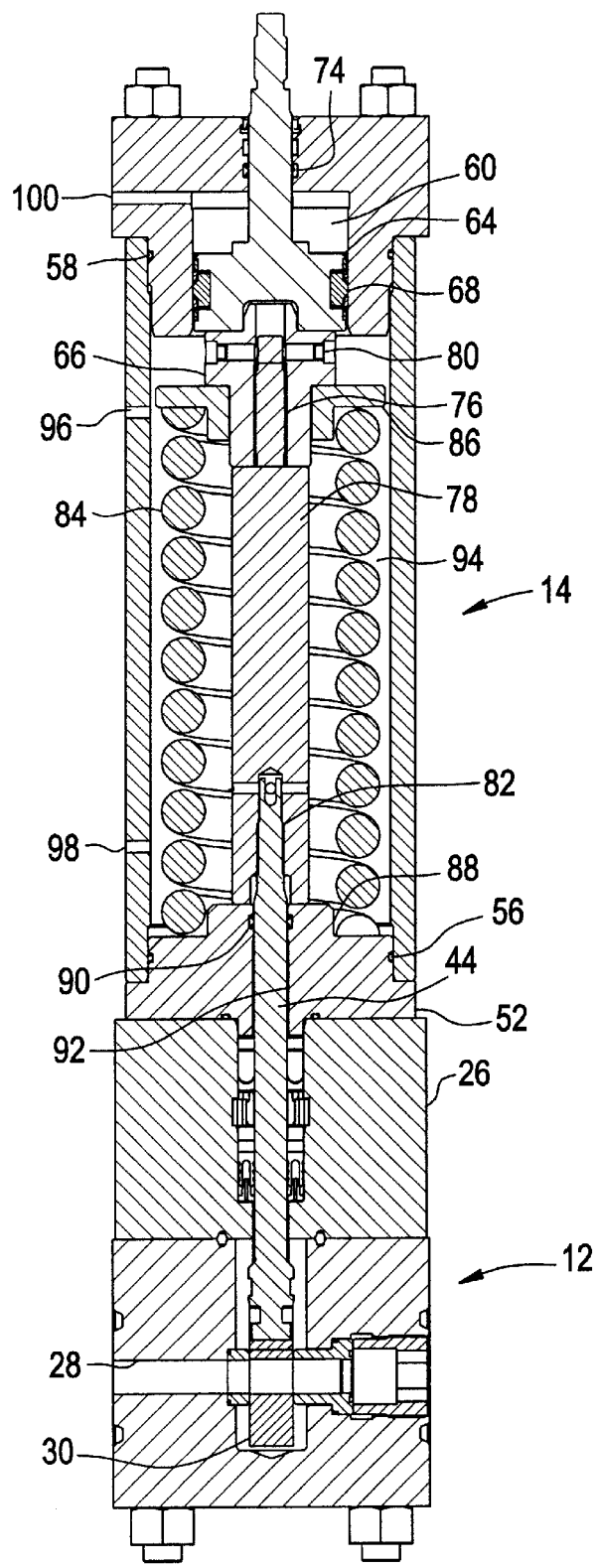
FIG. 3 is a sectional view of the valve and actuator assembly with the valve in the open position.
Figure 4:
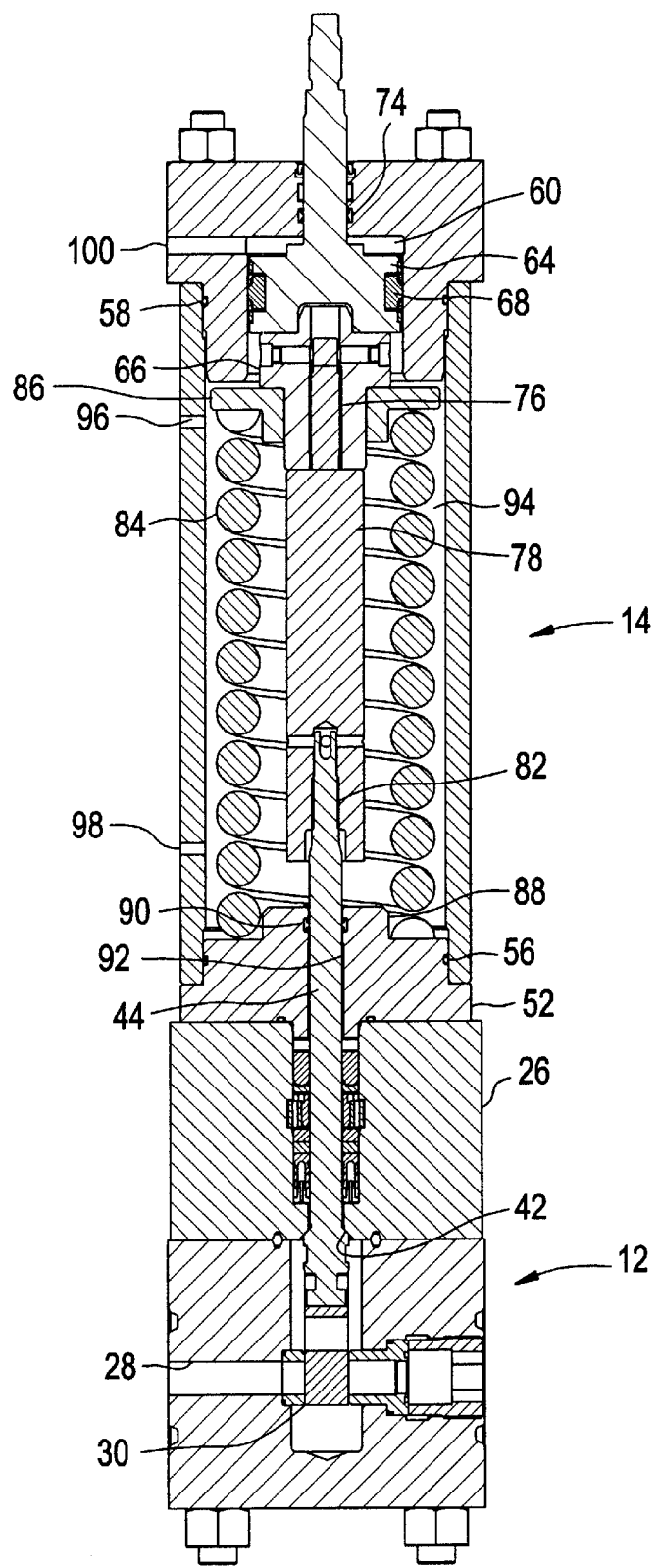
FIG. 4 is a sectional view of the valve and actuator assembly with the valve in the closed position.
Figure 5:
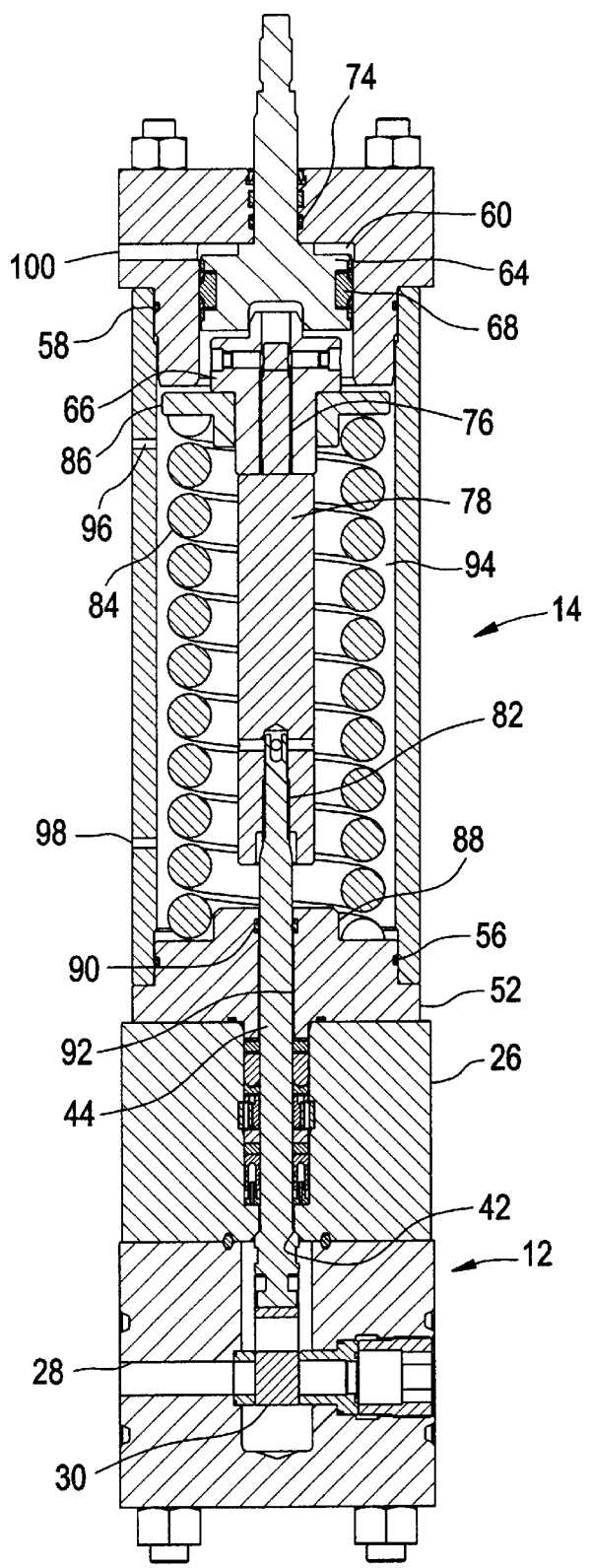
FIG. 5 is a sectional view of the valve and actuator assembly with the valve in the closed position and the piston sections separated.

The sequence of operation for the valve 12 and actuator 14 is best seen in FIGS. 3–5, in sectional view. In FIG. 3, pressurized control fluid is introduced through port 100 to pressurize upper pressure chamber 60. This pressure causes pressure responsive actuator piston 62, which is composed of piston 64 and spring retainer nut 66, to move toward valve 12. This movement through adapter stem 78 and valve stem 44 causes coil spring 84 to compress (and store energy) and gate member 30 to move to the position of FIG. 3 wherein gate bore 32 is aligned with fluid flow bore 28 and valve 14 is open. Pressurized control fluid is supplied to upper pressure chamber 60 by a control system and control system lines (not shown) and well known to those of ordinary skill in the art.

When it is desired to shut valve 12, the aforementioned control system is operated to vent the pressurized control fluid from upper pressure chamber 60 and allow coil spring 84 to expand and provide a motive force to urge pressure responsive actuator piston 62 to the position shown in FIG. 4. In this manner, gate member 30 is moved to the closed position shown. In this position, piston 64 and spring retainer nut 66 are still in contact.

Referring now to FIG. 5, the separation of piston 64 and spring retainer nut 66 is shown. This occurs in the following situations. As noted previously, valve 12 and valve actuator 14 are positioned in subsea tree 10 at a great water depth. Depending on the configuration of the control system used, ports 96 and 98 of interior pressure chamber 94 may be subjected to ambient water pressure which may be on the order of 4,000 psi at a depth of 8,000 feet. This ambient water pressure would be far greater than the normal atmospheric pressure of 0 psi for upper pressure chamber 60 during submersion of the equipment. Testing has shown the load thus generated is excessive and can cause a failure of the threaded connections between adapter stem 78 and pressure responsive actuator piston 62, if pressure responsive actuator piston 62 is of a typical one piece design.

The typical solution to these types of problems in the past has been to simply make the components larger. The disconnected piston of the present invention eliminates these problems and allows the use of smaller, lighter components. As noted above, when valve 12 is initially closed as in FIG. 4, piston 64 and spring retainer nut 66 are in contact. In the case where excessive ambient hydrostatic pressure is applied through ports 96 and 98, piston 64 and spring retainer nut 66 separate as pressure can only act across the diameter sealed by seal assembly 68. Spring 84 acts through spring retainer 86 on spring retainer nut 66 and through adapter stem 78 to cause stem 44 to seat against stem backseat shoulder 42 and prevent further movement of spring retainer nut 66. As piston 64 continues to the position of FIG. 5, this disconnection of the piston and spring retainer nut prevents any pressure-generated load from being transmitted to the stem threaded connections 76 and 82. When pressure is reapplied to upper pressure chamber 60 to open the valve, piston 64 moves toward spring retainer nut 66 until contact is made and continued movement opens valve 12 as previously described.

The construction of our valve actuator and valve apparatus will be readily understood from the foregoing description and it will be seen that we have provided a valve actuator and valve suitable for deepwater subsea applications that prevents ambient pressure from applying excessive damaging loads to the actuator and valve stem. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A hydraulically actuated valve actuator, comprising:

a spring housing including a bonnet for coupling said spring housing to a valve;

said bonnet including a valve stem bore extending through said bonnet and a sealing means disposed around said valve stem bore for sealing a valve stem extending through said bonnet;

said spring housing including an upper head and a packing gland, said upper head includes a counterbore therein to define a pressure chamber therein, said upper head and said packing gland sealingly engaging said spring housing to define an interior pressure chamber, said interior pressure chamber having a pressure responsive actuator piston disposed therein, an urging means disposed within said spring housing, said urging means urging said pressure responsive actuator piston between first and second positions;

said pressure responsive actuator piston coupled to said valve stem by an adapter stem;

said pressure responsive actuator piston including a piston and a spring retainer nut, said piston and said spring retainer nut separable to prevent ambient pressure acting within said pressure chamber on said pressure responsive actuator piston from loading said valve stem; and, said packing gland includes a raised inner face and pressure applied to said upper head pressure chamber urges said piston into contact with said spring retainer nut of said pressure responsive actuator piston and urges said adapter stem into contact with said raised inner face of said packing gland and said urging means to its first position.

2. A hydraulically actuated valve actuator according to claim 1, wherein:

said packing gland including a valve stem bore therethrough and a sealing means disposed around said valve stem bore for sealing said valve stem extending through said packing gland and said bonnet.

3. A hydraulically actuated valve actuator according to claim 2, wherein:

said piston of said pressure responsive actuator piston includes sealing means positioned thereon sealing within said counter bore of said upper head and said piston is reciprocable therein in response to pressure applied in said spring housing interior pressure chamber or said upper head pressure chamber.

4. A hydraulically actuated valve actuator according to claim 3, wherein:

said bonnet includes a stem backseat shoulder;

said valve stem includes a corresponding backseat shoulder; and, said valve stem backseat shoulder contacts said bonnet backseat shoulder when said urging means urges said pressure responsive actuator piston to said second position and thereby limits movement of said spring retainer nut of said pressure responsive actuator piston.

5. A hydraulically actuated valve actuator according to claim 3, wherein:

said urging means is a spring.

6. A hydraulically actuated valve actuator according to claim 5, wherein:

said spring is a coil spring.

7. A hydraulically actuated valve actuator according to claim 6, wherein:

said upper head includes a fluid port for supplying pressurized fluid to said upper head pressure chamber; and, said spring housing includes a fluid port for supplying pressurized fluid to said interior pressure chamber.

8. A hydraulically actuated valve actuator and valve assembly, comprising:

a valve having a fluid flow bore therethrough, said valve having a gate member movable between first and second positions for opening and closing said fluid flow bore, a valve stem coupled to said gate member;

a spring housing including a bonnet for coupling said spring housing to said valve;

said bonnet including a valve stem bore extending through said bonnet and a sealing means disposed around said valve stem bore for sealing said valve stem extending through said bonnet;

said spring housing including an upper head and a packing gland, said upper head includes a counterbore therein to define a pressure chamber therein, said upper head and said packing gland sealingly engaging said spring housing to define an interior pressure chamber, said interior pressure chamber having a pressure responsive actuator piston disposed therein, an urging means disposed within said spring housing, said urging means urging said pressure responsive actuator piston between first and second positions;

said pressure responsive actuator piston coupled to said valve stem by an adapter stem;

said pressure responsive actuator piston including a piston and a spring retainer nut, said piston and said spring retainer nut separable to prevent ambient pressure acting within said pressure chamber on said pressure responsive actuator piston from loading said valve stem; and, said packing gland includes a raised inner face and pressure applied to said upper head pressure chamber urges said piston into contact with said spring retainer nut of said pressure responsive actuator piston and urges said adapter stem into contact with said raised inner face of said packing gland and said urging means to its first position.

9. A hydraulically actuated valve actuator and valve assembly according to claim 8, wherein:

said packing gland including a valve stem bore therethrough and a sealing means disposed around said valve stem bore for sealing said valve stem extending through said packing gland and said bonnet.

10. A hydraulically actuated valve actuator and valve assembly according to claim 9, wherein:

said piston of said pressure responsive actuator piston includes sealing means positioned thereon sealing within said counter bore of said upper head and said piston is reciprocable therein in response to pressure applied in said spring housing interior pressure chamber or said upper head pressure chamber.

11. A hydraulically actuated valve actuator and valve assembly according to claim 10, wherein:

said bonnet includes a stem backseat shoulder;

said valve stem includes a corresponding backseat shoulder; and, said stem backseat shoulder contacts said bonnet stem backseat shoulder when said urging means urges said pressure responsive actuator piston to said second position and thereby limits movement of said spring retainer nut of said pressure responsive actuator piston.

12. A hydraulically actuated valve actuator and valve assembly according to claim 11, wherein:

said urging means is a spring.

13. A hydraulically actuated valve actuator and valve assembly according to claim 12, wherein:

said spring is a coil spring.

14. A hydraulically actuated valve actuator and valve assembly according to claim 13, wherein:

said upper head includes a fluid port for supplying pressurized fluid to said upper head pressure chamber; and, said spring housing includes a fluid port for supplying pressurized fluid to said interior pressure chamber.

* * * * *